J. H. KENDIG.
SUPPORT FOR ELECTRICAL FIXTURES.
APPLICATION FILED SEPT. 5, 1916.
1,246,107.
Patented Nov. 13, 1917.
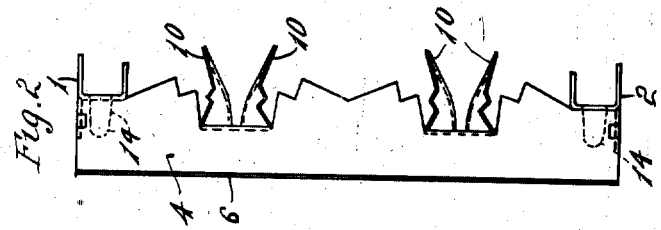
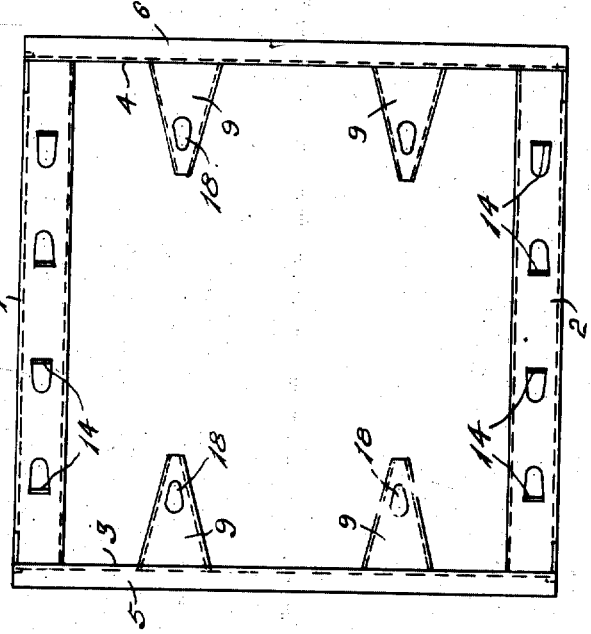
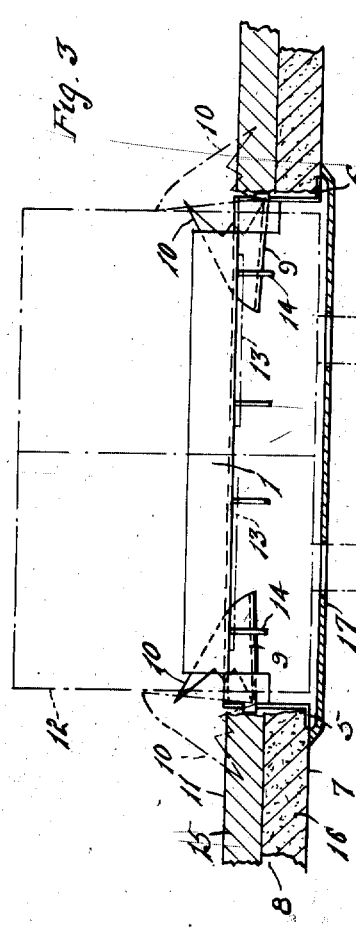

UNITED STATES PATENT OFFICE.

JULIAN H. KENDIG, OF PITTSBURGH, PENNSYLVANIA.

SUPPORT FOR ELECTRICAL FIXTURES.

1,246,107.  Specification of Letters Patent.  Patented Nov. 13, 1917.

Application filed September 5, 1916. Serial No. 118,565.

*To all whom it may concern:*

Be it known that I, JULIAN H. KENDIG, a citizen of the United States, residing at Pittsburgh, in the county of Allegheny and State of Pennsylvania, have invented certain new and useful Improvements in Supports for Electrical Fixtures, of which the following is a specification.

This invention relates to supports for electrical fixtures, particularly switch boxes, outlet boxes and like fixtures; and has for its principal objects, the provision of a bracket or support that may be used in old walls of houses to support fixtures thereon; the provision of a bracket that may be easily applied in old walls of the lath and plaster construction or similar constructions; the provision of a bracket that may be stamped cheaply from a single piece of sheet metal and may be quickly applied to the wall without the use of nails or screws; the provision of a bracket wherein the fixture may be secured thereto without the use of nails or screws, and such other objects as may hereinafter appear. One embodiment of the invention is shown in the accompanying drawing, wherein—

Figure 1 is a front view of the bracket; Fig. 2 is a side elevation thereof; and Fig. 3 is an end elevation of the bracket shown applied to a wall.

Referring to the drawing, the bracket consists of a pair of channel shaped supporting bars 1 and 2, connected at their ends by means of the side frames 3 and 4. The side frames are provided with laterally extending flanges 5 and 6 respectively, which are adapted to engage the front face 7 of the wall 8, Fig. 3, when the bracket is inserted in the hole cut in the wall to receive the bracket and the fixture.

The side frames are provided with clamping lugs 9 which are normally bent at right angles to the side frames as indicated in Figs. 1 and 3. Each lug is provided with a pair of rearwardly extending pointed webs 10 adapted to engage and penetrate the rear face 11 of the wall 8 when the lugs are bent back, as indicated in dotted lines, Fig. 3. When the lugs 9 are bent back into engagement with the rear face of the wall the bracket is securely clamped therein ready to receive a fixture 12, indicated in dotted lines, Fig. 3.

In the case illustrated, the fixture consists of a pair of switch boxes 12 provided with supporting ears 13 adapted to engage the channels 1 and 2. The channels 1 and 2 are provided with upstruck ears or lugs 14 adapted to project through perforations in the ears 13. When the fixture is applied to the supporting channels, the ears 14 are bent over into engagement with the ears 13 carried by the switch boxes, thereby firmly securing the fixture to the bracket without the use of screws or nails.

As illustrated in Fig. 3, the wall consists of lath 15 and plaster 16. The lugs 9 are so located that at least two pointed webs will engage two lath on each side of the bracket, thus insuring a secure fastening of the bracket to the wall. A face plate 17 of larger size than the bracket is applied to the front of the wall and entirely covers the bracket.

Heretofore, where a switch box was applied to an old wall, a hole was cut to allow the switch box to project into the wall, and the box ears were screwed to the lath. The lath would not always be in the proper position to receive the ears so that screws could be properly inserted. The result was the improper and insecure mounting of the fixture.

The operation of the device herein described is as follows. First a hole just of sufficient size to permit the bracket to be inserted therein, is cut in the wall, and the bracket inserted until the flanges 5 and 6 engage the front face thereof. A screw driver or other tool is inserted in the perforations 18, provided for the purpose, and the lugs 9 pressed back until they are in the position shown in dotted lines, Fig. 3. This action securely clamps the bracket to the wall. The fixture is next inserted which engages the lugs 9 and holds them in place. The ears 14 are then bent over upon the box ears 13, which action securely clamps the fixture to the bracket.

The ears 13 of standard switch boxes are spaced to the rear of the front face of the box, which should come flush with the front face of the wall when properly applied, and for this reason the channels 1 and 2 are spaced to the rear of the front face of the wall.

It will be noted that the entire bracket consists of a single piece of sheet metal and that no screws or nails are required in applying the bracket to the wall or the fixture to the bracket, and that the bracket can be made to receive any number of fixtures by either making it longer or shorter.

It is obvious that many changes may be made in the details of the construction without departing from the spirit of the invention, and the invention, is, therefore, not limited to the specific construction herein illustrated.

What I claim is:

1. A bracket for supporting fixtures upon a wall, comprising a frame provided with laterally extended flanges adapted to engage the front face of the wall, means for securing a fixture to the frame, and means integral with the frame adapted to be bent into engagement with the rear face of the wall for securing the frame to the wall.

2. A bracket for supporting fixtures upon a wall, comprising a frame adapted to extend into a hole in the wall and provided with laterally extending flanges adapted to engage the front face of the wall, means for securing a fixture to the frame and means carried by the frame adapted to be moved into engagement with the wall behind the front face thereof whereby the frame is secured to the wall.

3. A bracket for supporting fixtures upon a wall, comprising a frame adapted to extend into a hole in the wall and provided with laterally extending flanges adapted to engage the front face of the wall, means for securing a fixture to the frame and means integral with the frame adapted to be bent into engagement with the wall behind the front face thereof whereby the frame is secured to the wall.

4. A bracket for supporting fixtures upon a wall, comprising a frame adapted to extend into a hole in the wall and provided with laterally extending flanges adapted to engage the front face of the wall, means for securing a fixture to the frame and means carried by the frame adapted to be moved into engagement with the wall and retained in engaged position by the fixture whereby the frame is secured to the wall.

5. A bracket for supporting fixtures upon a wall, comprising a frame adapted to extend into a hole in the wall and provided with laterally extending flanges adapted to engage the front face of the wall, means for securing a fixture to the frame and means carried by the frame adapted to be moved into engagement with the wall, the said means being provided with a socket adapted to receive a tool for moving it into engagement with the wall.

6. A bracket for supporting fixtures within a hole in a wall, comprising a pair of side members extending into the hole in the wall provided with lateral flanges adapted to engage the front face of the wall, supporting bars joining the side members to the rear of the front face of the wall, means on the supporting members for securing a fixture thereon, and means on the side members engaging the wall behind the front face thereof for securing the bracket to the wall.

JULIAN H. KENDIG.